US010698452B2

(12) United States Patent
Fenton et al.

(10) Patent No.: US 10,698,452 B2
(45) Date of Patent: Jun. 30, 2020

(54) PORTABLE ELECTRONIC DEVICE CASE

(71) Applicant: Fairhaven Group, Inc., Seattle, WA (US)

(72) Inventors: Timothy John Fenton, Mercer Island, WA (US); Gary Allen Ashley, Seattle, WA (US)

(73) Assignee: PIONEER SQUARE BRANDS, INC., McLean, VA (US)

( * ) Notice: Subject to any disclaimer, the term of this patent is extended or adjusted under 35 U.S.C. 154(b) by 0 days.

(21) Appl. No.: 15/647,808

(22) Filed: Jul. 12, 2017

(65) Prior Publication Data

US 2019/0018449 A1    Jan. 17, 2019

(51) Int. Cl.
*G06F 1/16* (2006.01)
*A45C 11/00* (2006.01)

(52) U.S. Cl.
CPC ............ *G06F 1/166* (2013.01); *G06F 1/1607* (2013.01); *A45C 2011/003* (2013.01); *A45C 2200/15* (2013.01)

(58) Field of Classification Search
CPC .......... G06F 1/16; G06F 1/1607; G06F 1/166; A45C 2011/003; A45C 2200/15; F16M 11/04; F16M 11/041; F16M 11/10; F16M 13/00; F16M 13/04; F16M 11/105; H05K 5/0234; H05K 5/03; B65H 75/4476; B65H 2701/3919; A45F 5/02; A45F 2200/0516
USPC .......................... 248/457, 460–465, 919–923
See application file for complete search history.

(56) References Cited

U.S. PATENT DOCUMENTS

| | | | | | |
|---|---|---|---|---|---|
| 2,007,535 | A | * | 7/1935 | Kapnek | A47G 1/143 248/455 |
| 2,008,093 | A | * | 7/1935 | Carwardine | A47G 1/143 248/472 |
| D128,172 | S | * | 7/1941 | Morgan | D19/91 |
| 2,591,170 | A | * | 4/1952 | Levinson | G09F 5/00 248/456 |
| 3,095,834 | A | * | 7/1963 | Killen | A47B 85/06 108/15 |
| 5,366,197 | A | * | 11/1994 | Westland | A47B 23/043 248/452 |
| 5,732,928 | A | * | 3/1998 | Chang | G06F 3/0208 248/456 |
| 6,098,952 | A | * | 8/2000 | Tonn | A47B 23/043 248/455 |
| 6,237,887 | B1 | * | 5/2001 | Banner | A47B 23/004 248/459 |
| 6,971,622 | B2 | * | 12/2005 | Ziegler | F16M 11/10 248/454 |
| 7,001,088 | B2 | * | 2/2006 | Hui-Hu | G06F 3/0208 248/127 |

(Continued)

*Primary Examiner* — Ko H Chan
(74) *Attorney, Agent, or Firm* — Grandview Law

(57) ABSTRACT

Systems and methods are involved with but are not limited to: a housing sized to receive a tablet shaped electronic device, the housing including a recessed back; and a stand assembly movably coupled to the housing for adjustment of the stand assembly between one or more open dispositions and a closed disposition having a collapsed configuration, the recessed back sized to receive the stand assembly in the collapsed configuration. In addition to the foregoing, other aspects are described in the claims, drawings, and text forming a part of the present disclosure.

12 Claims, 12 Drawing Sheets

(56) References Cited

U.S. PATENT DOCUMENTS

| | | | | |
|---|---|---|---|---|
| 7,168,672 | B2* | 1/2007 | Hsu | A47B 97/08 |
| | | | | 248/441.1 |
| D626,964 | S * | 11/2010 | Richardson | D14/447 |
| 7,861,995 | B2* | 1/2011 | Liou | F16M 11/105 |
| | | | | 248/454 |
| 8,360,382 | B2* | 1/2013 | Wu | F16M 11/10 |
| | | | | 248/165 |
| 8,464,995 | B2* | 6/2013 | Yang | F16M 11/10 |
| | | | | 248/454 |
| 9,194,536 | B2* | 11/2015 | Kim | F16M 13/00 |
| 9,377,810 | B2* | 6/2016 | Hishinuma | G06F 1/1613 |
| 9,795,213 | B1* | 10/2017 | Vier | G06F 3/0231 |
| 2008/0006745 | A1* | 1/2008 | Chong | F16M 11/10 |
| | | | | 248/166 |
| 2010/0072334 | A1* | 3/2010 | Le Gette | F16M 13/00 |
| | | | | 248/176.3 |
| 2011/0031287 | A1* | 2/2011 | Le Gette | F16M 11/04 |
| | | | | 224/101 |
| 2012/0199501 | A1* | 8/2012 | Le Gette | F16M 11/04 |
| | | | | 206/45.24 |

\* cited by examiner

US 10,698,452 B2

PORTABLE ELECTRONIC DEVICE CASE

SUMMARY

In one aspect, an apparatus includes, but is not limited to a housing sized to receive a tablet shaped electronic device, the housing including a recessed back; and a stand assembly movably coupled to the housing for adjustment of the stand assembly between one or more open dispositions and a closed disposition having a collapsed configuration, the recessed back sized to receive the stand assembly in the collapsed configuration. Other aspects are described in the claims, drawings, and text forming a part of the disclosure set forth herein.

In addition to the foregoing, various other aspects are set forth and described in the teachings such as text (e.g., claims and/or detailed description) and/or drawings of the present disclosure. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise.

With reference now to the figures, shown are one or more examples of disparate material outsole based articles of manufacture, compositions of matter, systems for producing and/or methods for producing same that may provide context, for instance, in introducing one or more processes and/or devices described herein.

DETAILED DESCRIPTION

Figure 1:
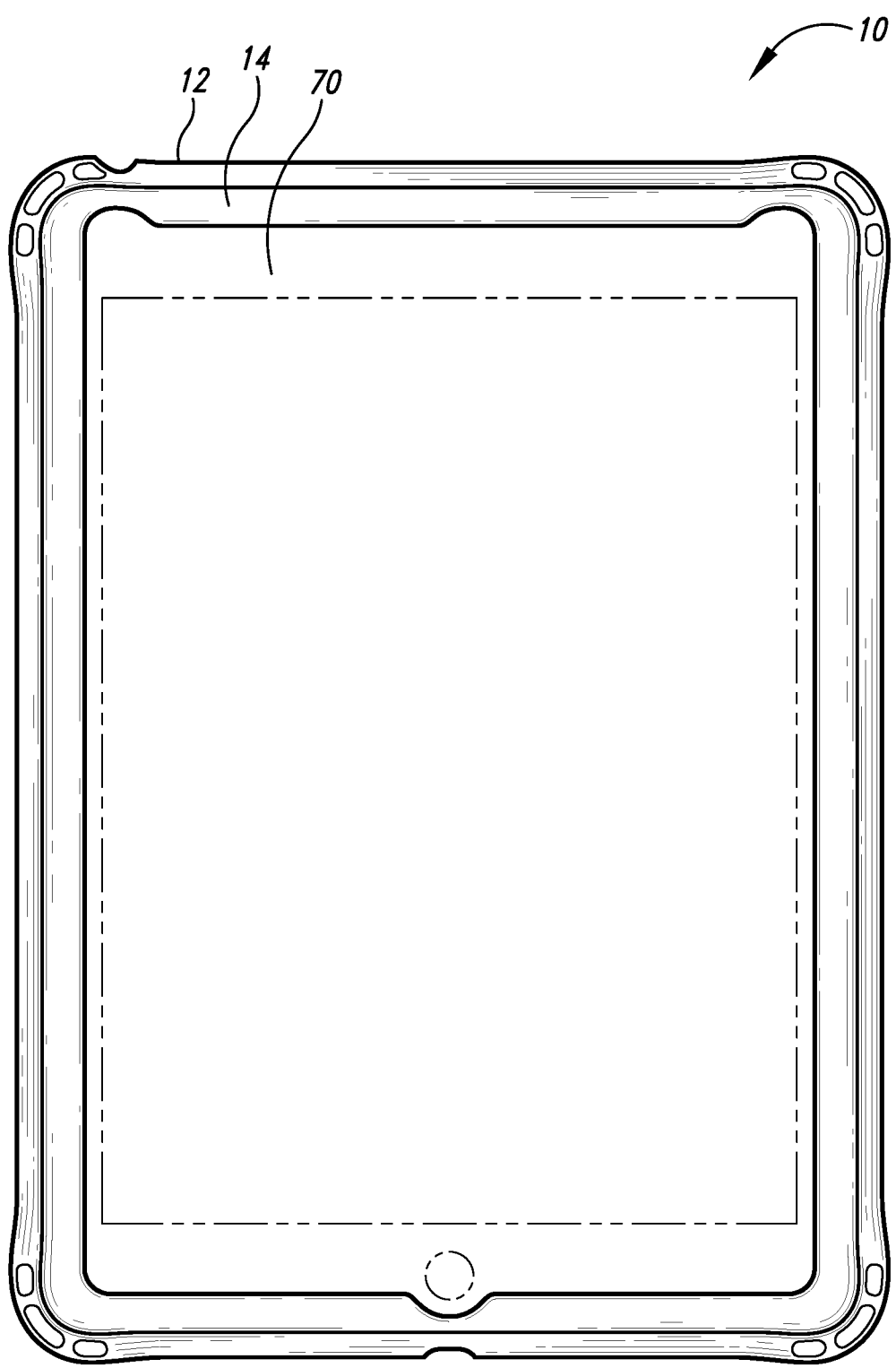
FIG. 1 is a front plan view of a portable device case.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Portable electronic devices, such as electronic tablets, along with their conventional cases, can pose challenges to proper orientation for convenient or effective viewing or use.

Referring now to FIG. 1, a first embodiment of portable device case 10 is depicted from a front plan view to include housing 12 containing an exemplary electronic tablet device 70 and further including bezel 14 to secure electronic tablet device 70 in housing 12. Typical of electronic tablet devices, electronic tablet device 70 is shaped as a tablet with a form of a rectangular slab or plaque with its display surface (demarcated in FIG. 1 by dashed line rectangle) being framed by bezel 14.

Figure 2:
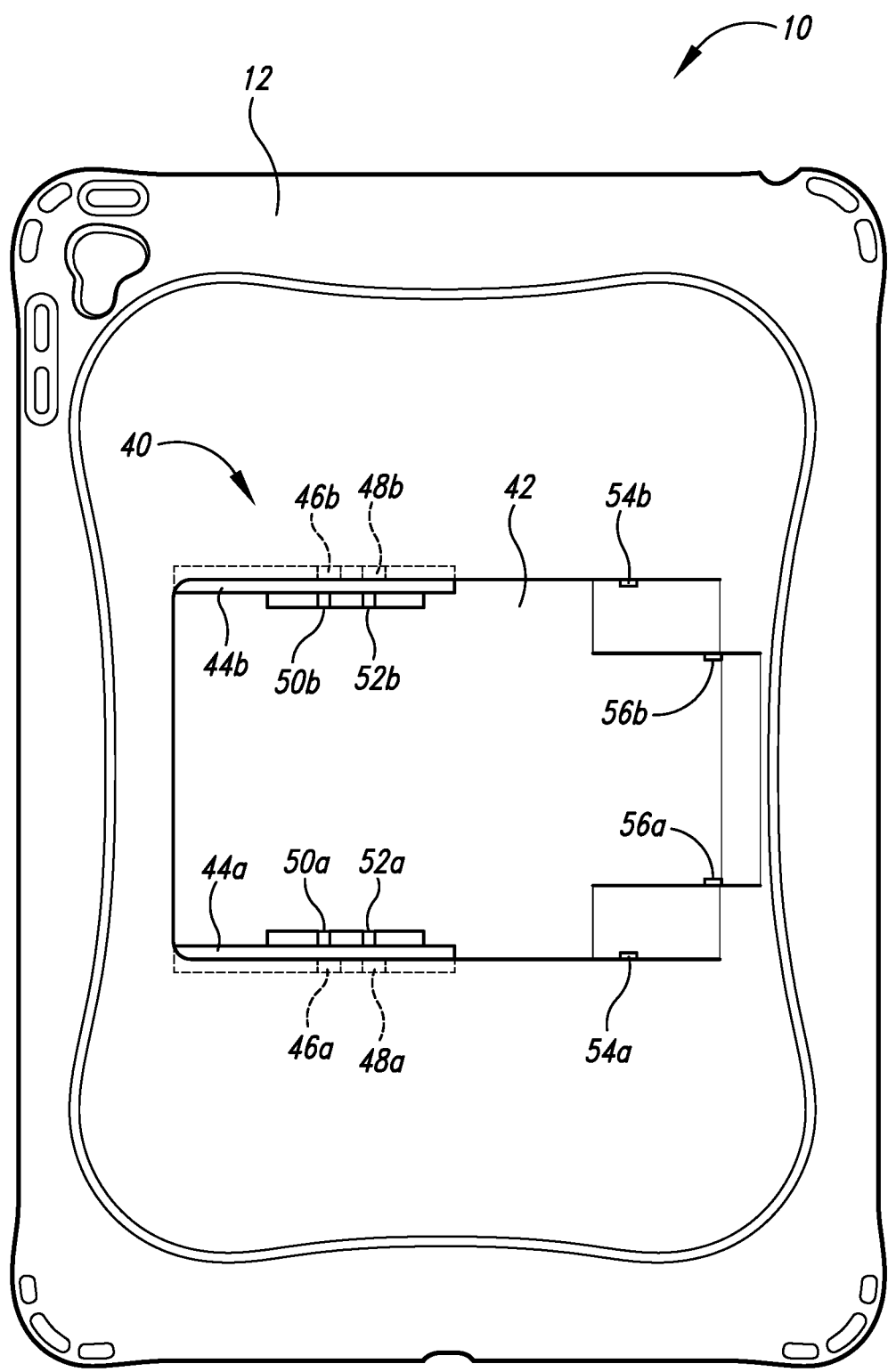
FIG. 2 is a rear plan view of the portable device case showing its engagement portion without adjustable stand assembly engaged.
Figure 3:
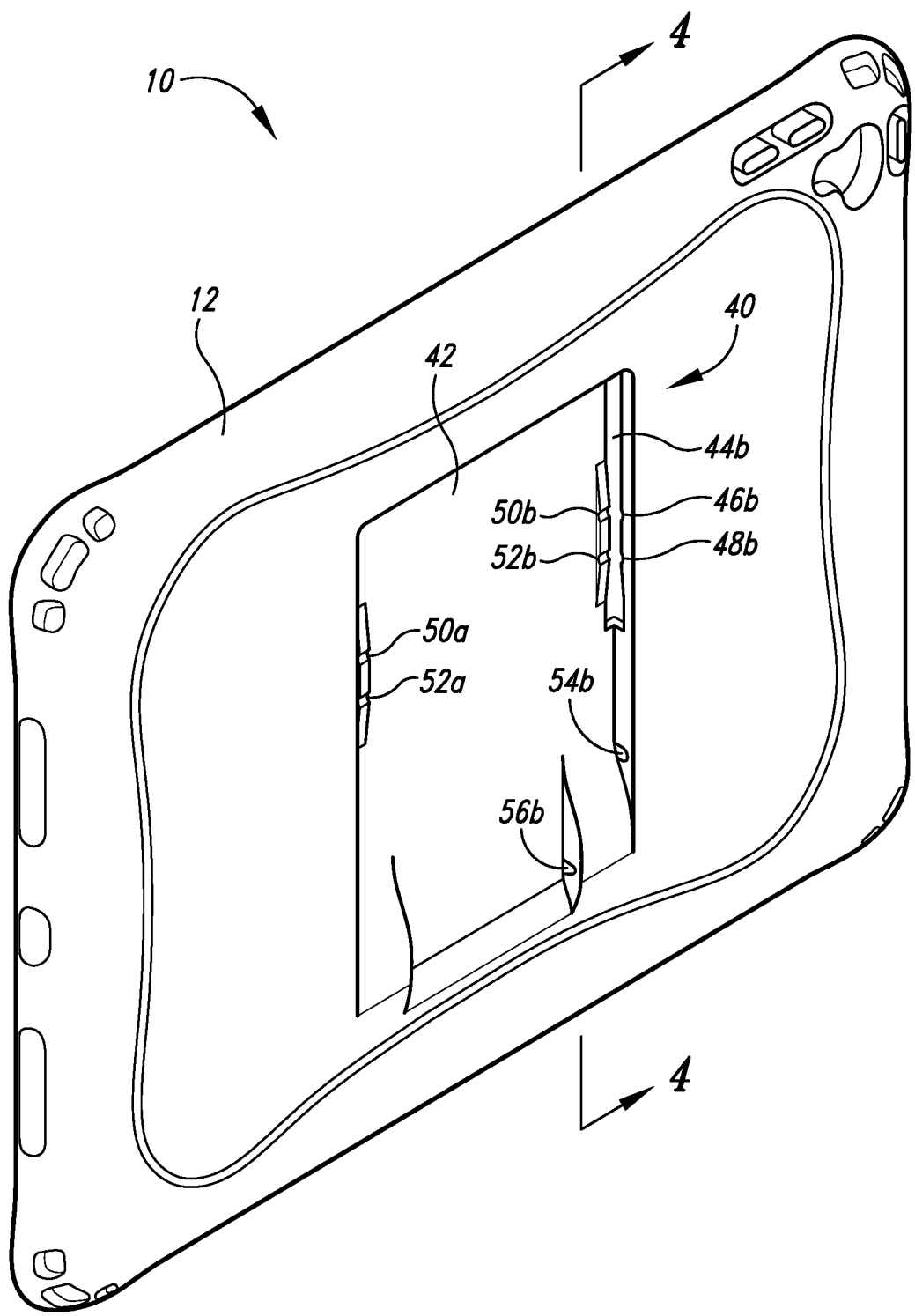
FIG. 3 is a rear perspective view of the portable device case showing its engagement portion without adjustable stand assembly engaged thereto.
Figure 4:
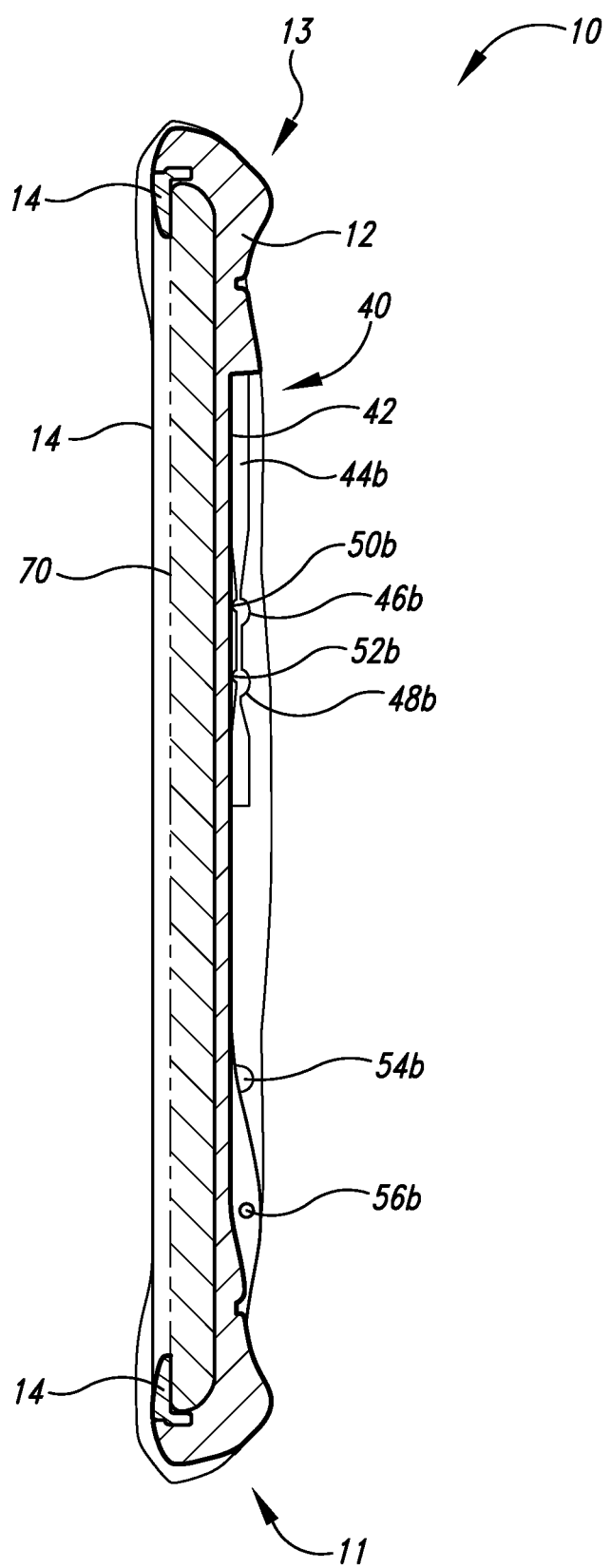
FIG. 4 is a cross sectional view of the portable device case of FIG. 3 showing its engagement portion without adjustable stand assembly engaged thereto.

Referring now to FIG. 2, portable device case 10 is depicted from a rear plan view showing its rearward engagement portion 40 having recessed back 42, left side 44a and right side 44b. Left track 44a includes first pair of front catch 46a and back catch 50a, second pair of front catch 48a and back catch 52a, single catch 54a, and shaft insert 56a. More readily shown in FIG. 3, right track 44b includes first pair of front catch 46b and back catch 50b, second pair of front catch 48b and back catch 52b, single catch 54b, and shaft insert 56b. As shown in FIG. 4 with cross-sectional view, housing 12 includes oppositely sided substantially parallel first horizontal edge 11 and second horizontal edge 13.

Figure 5:
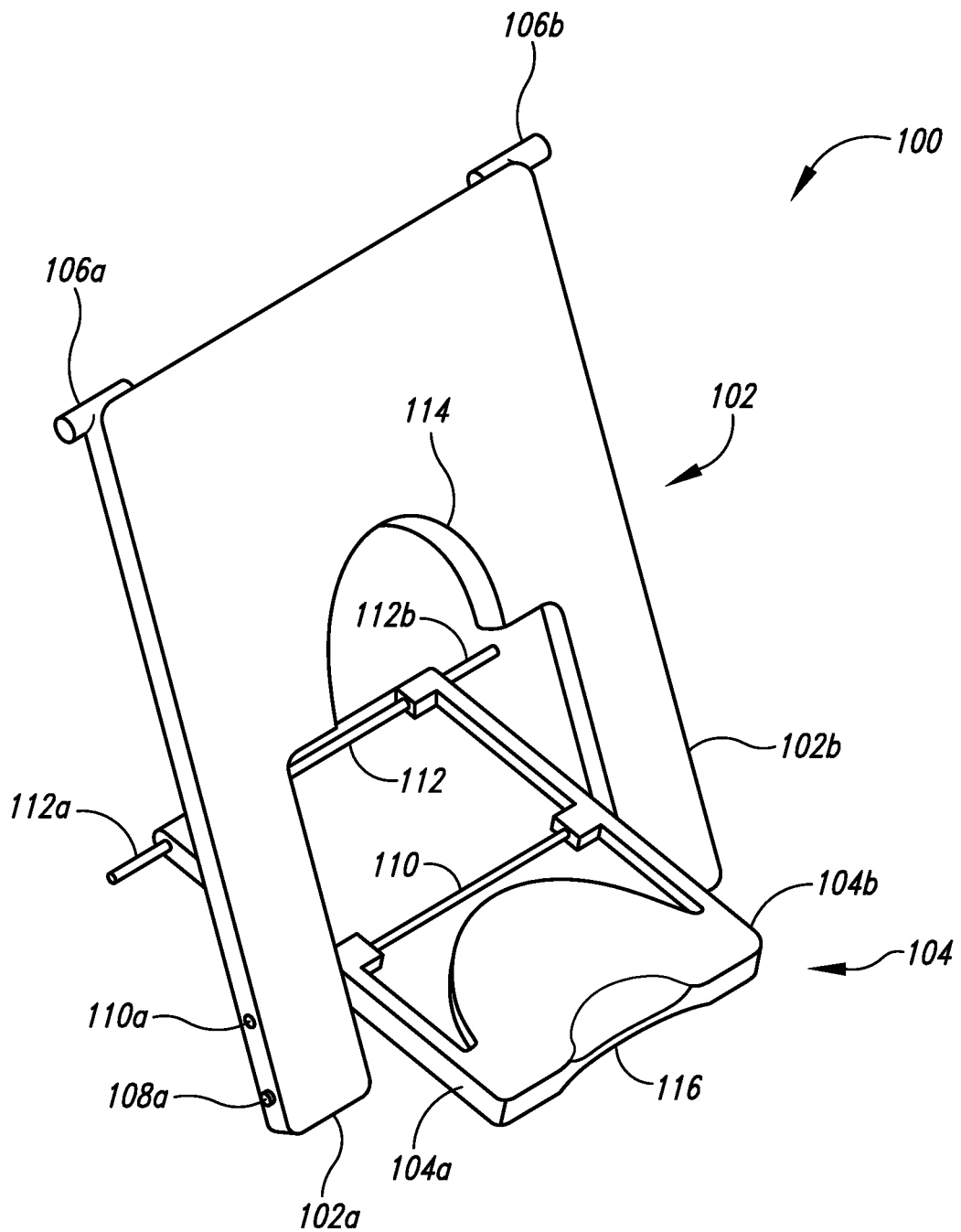
FIG. 5 is a rear perspective isolated view of the adjustable stand assembly in the first open disposition.

Referring now to FIG. 5, adjustable stand assembly 100 is depicted from a rear perspective isolated view as being oriented in a first open disposition to include first member 102 and second member 104 rotatable coupled about shaft 110. First member 102 includes left portion 102a and right portion 102b with in a gap sized to position second member 104 to extend therebetween and to be rotably coupled to both left portion 102a and right portion 102b about shaft 110 that extends between left portion 102a to right portion 102b. Left portion 102a includes left peg 106a located on a first corner of a first end of first member 102, left nub 108a, and left shaft hole 110a. Right portion 102b includes right peg 106b located on a second corner of the first end of the first member 102 opposite the left peg 106a, and, on opposite side of the left nub 108a, right nub 108b (not shown but relatively equivalent in size and position to left nub 108b). Both left peg 106a and right peg 106b extend from first member 102 substantially parallel with shaft 110 of second member 104. First member 102 also includes cutout access 114. Second member 104 also includes rod 112 with left end 112a and right end 112*b*, left portion 104*a*, right portion 104*b*, and tapered end 116. Rod 112 is positioned substantially parallel with shaft 110 of second member 104.

Figure 6:
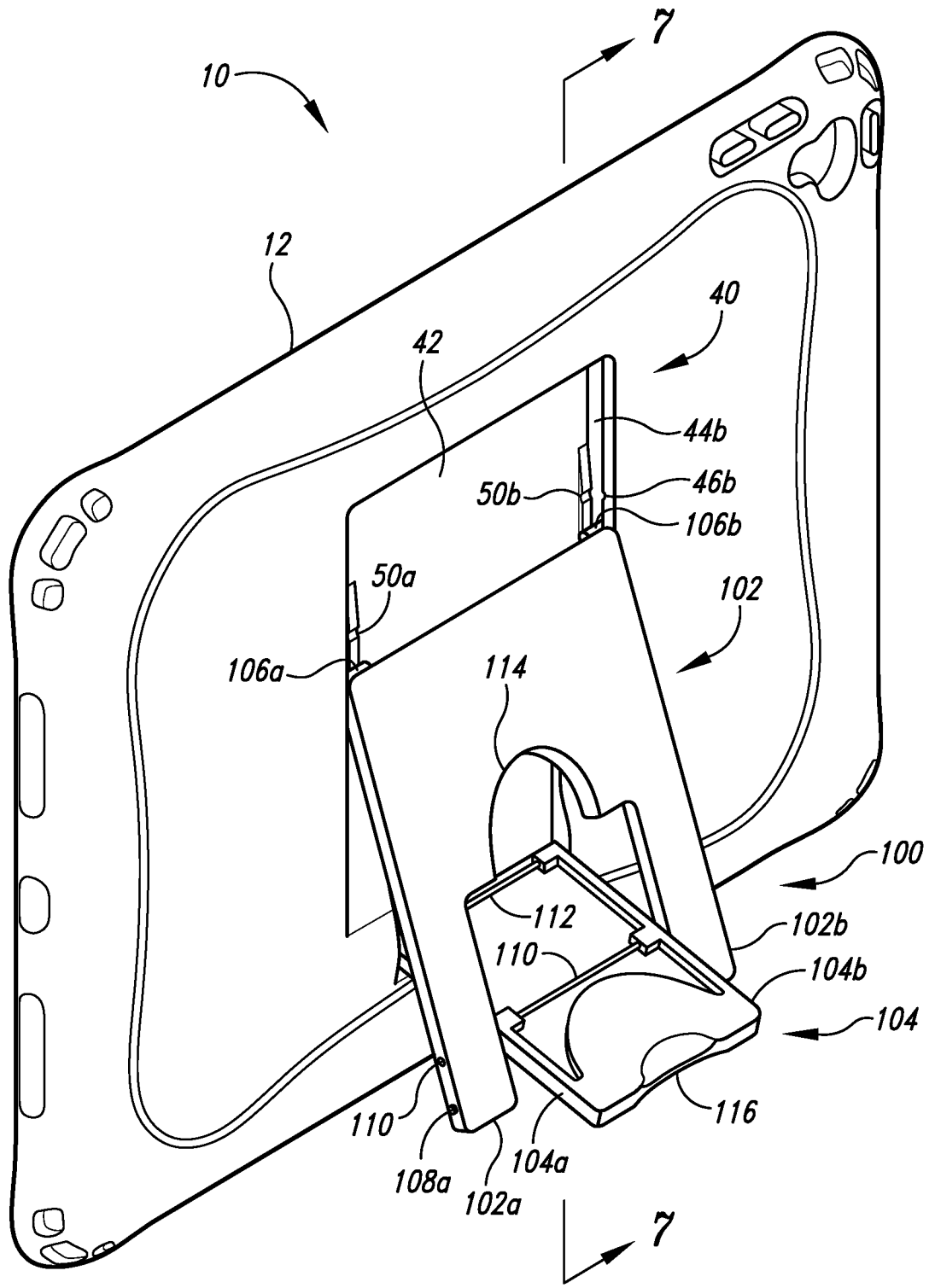
FIG. 6 is a rear perspective view of the portable device case showing its engagement portion with adjustable stand assembly engaged thereto in a first open disposition.

Referring now to FIG. 6, portable device case 10 is shown in rear perspective view with adjustable stand assembly 100 engaged with housing 12 in the first open disposition with both first member 102 pivoted from housing 12 about peg 106*a* and about peg 106*b* and second member 104 pivoted from housing 12 about rod 102. As shown, peg 106*a* is positioned between front catch 48*a* and back catch 52*a*, which are oppositely facing and longitudinally spaced apart along peg 106*a* to allow detachable engagement of peg 106*a* by applied force to push peg 106*a* out of engagement with front catch 48*a* and back catch 52*a* to be slidably engaged with left track 44*a* so that peg 106*a* can be slid along left track 44*a* to another engagement position; peg 106*b* is positioned between front catch 48*b* and back catch 52*b*, which are oppositely facing and longitudinally spaced apart along peg 106*b* to allow detachable engagement of peg 106*b* by applied force to push peg 106*b* out of engagement with front catch 48*b* and back catch 52*b* to be slidably engaged with right track 44*b* so that peg 106*b* can be slid along right track 44*b* to another engagement position; left nub 108*a* and right nub 108*b* (not shown) are released from being held by single catch 54*a* and single catch 54*b*, respectively.

Figure 7:
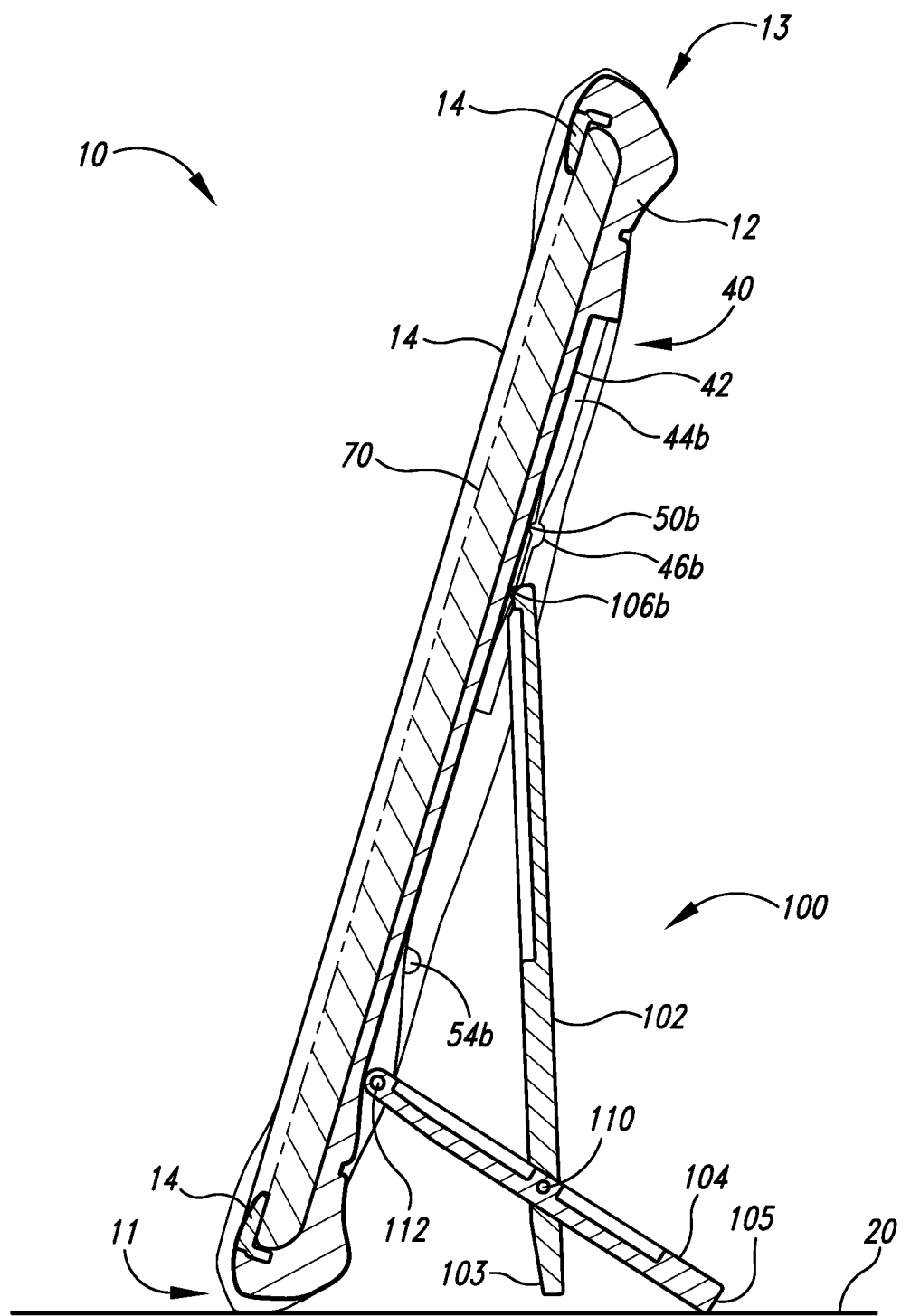
FIG. 7 is a cross sectional view of the portable device case of FIG. 6 showing its engagement portion with adjustable stand assembly engaged thereto in the first open disposition with a first orientation to a horizontal support surface.

Referring now to FIG. 7, portable device case 10 of FIG. 6 is shown in cross-sectional view wherein adjustable stand assembly 100 is engaged thereto in the first open disposition and a first orientation with horizontal edge 11 and end 105 of second member 104 in contact with horizontal support surface 20.

Figure 8:
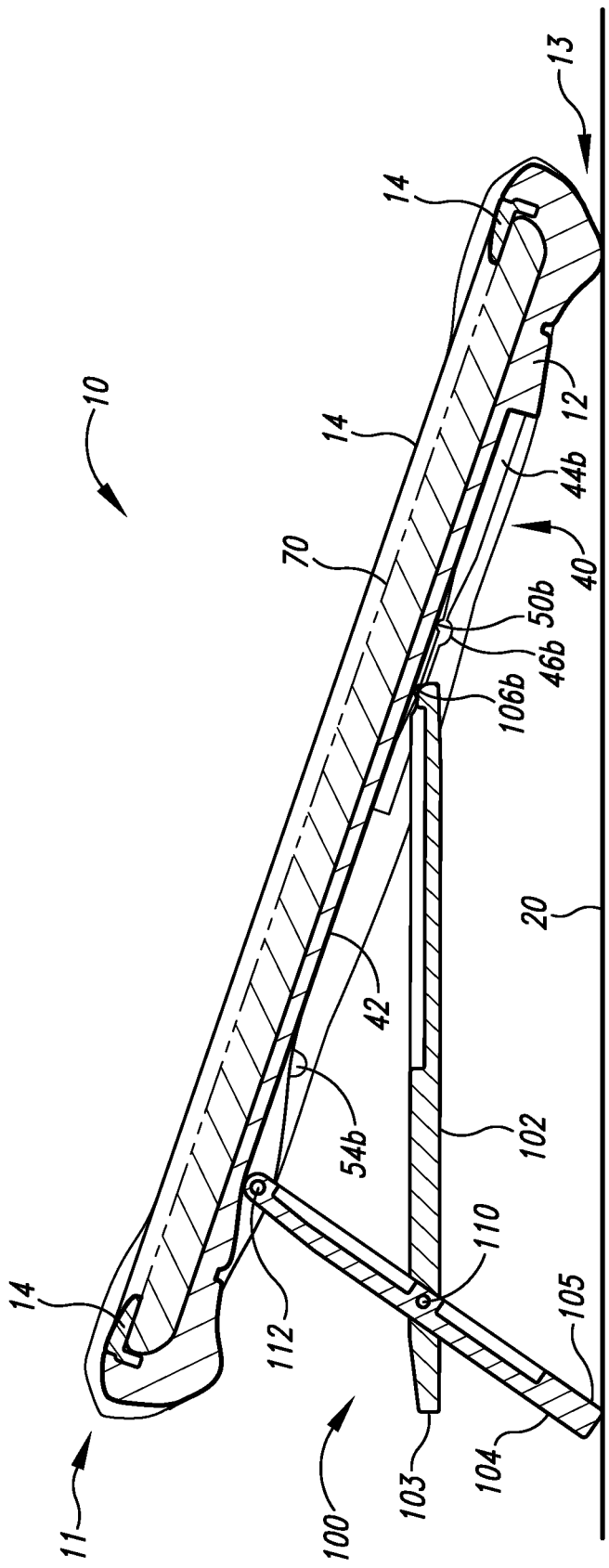
FIG. 8 is a cross sectional view of the portable device case showing its engagement portion with adjustable stand assembly engaged thereto in the first open disposition with a second orientation to a horizontal support surface.

Referring now to FIG. 8, portable device case 10 of FIG. 6 is shown in cross-sectional view wherein adjustable stand assembly 100 is engaged thereto in the first open disposition and a second orientation with horizontal edge 11 and end 105 of second member in contact with horizontal support surface 20.

Figure 9:
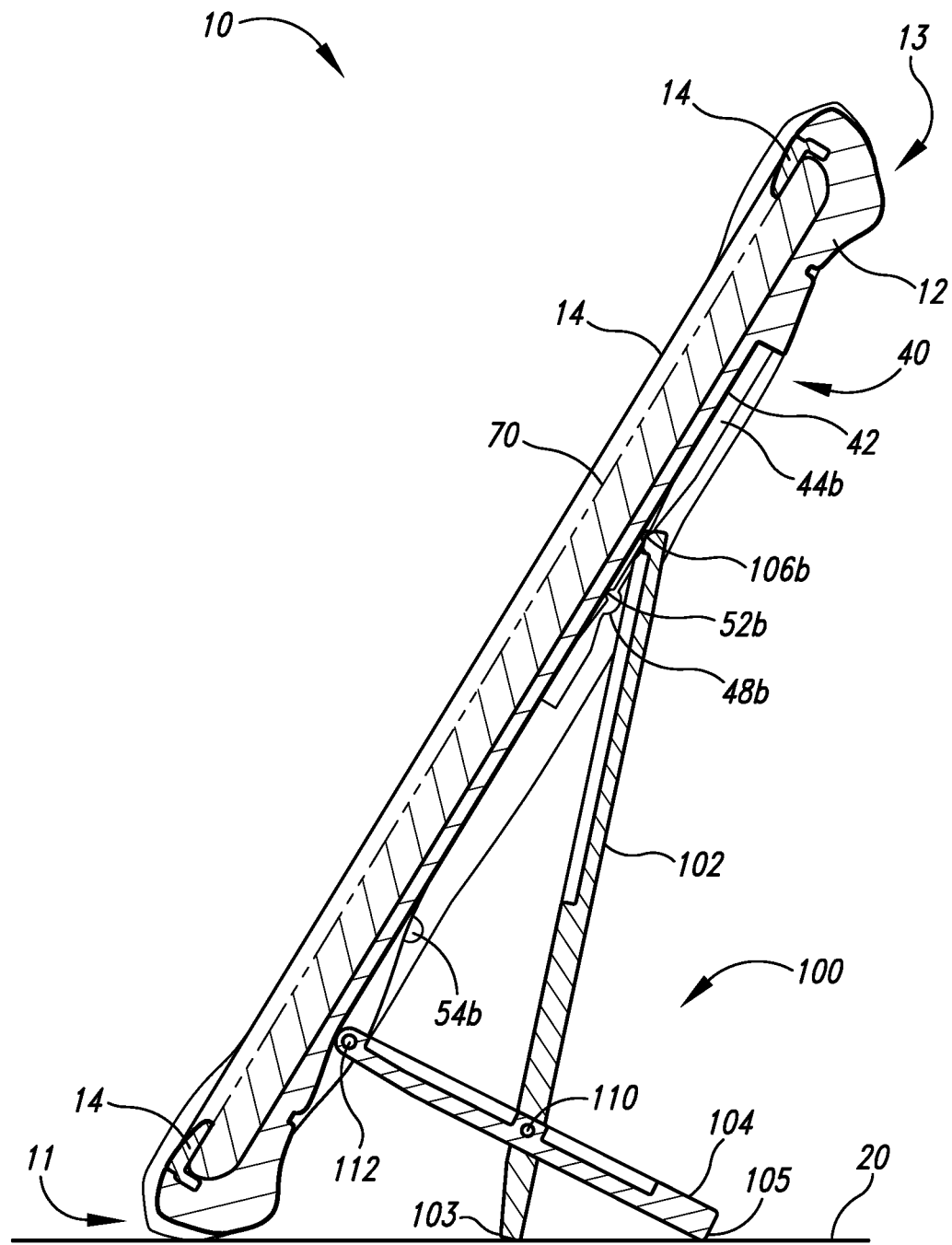
FIG. 9 is a cross sectional view of the portable device case showing its engagement portion with adjustable stand assembly engaged thereto in a second open disposition with a first orientation to a horizontal support surface.

Referring now to FIG. 9, portable device case 10 is shown in cross-sectional view wherein adjustable stand assembly 100 is engaged thereto in a second open disposition and a first orientation with horizontal edge 11, end 103 of first member 102, and end 105 of second member 104 all in contact with horizontal support surface 20. First member 102 is pivoted from housing 12 about peg 106*a* and about peg 106*b*; and second member 104 is pivoted from housing 12 about rod 102. In this second open disposition, peg 106*a* (not shown) is positioned between front catch 46*a* (not shown) and back catch 50*a* (not shown); peg 106*b* is positioned between front catch 46*b* (not shown) and back catch 50*b* (not shown).

Figure 10:
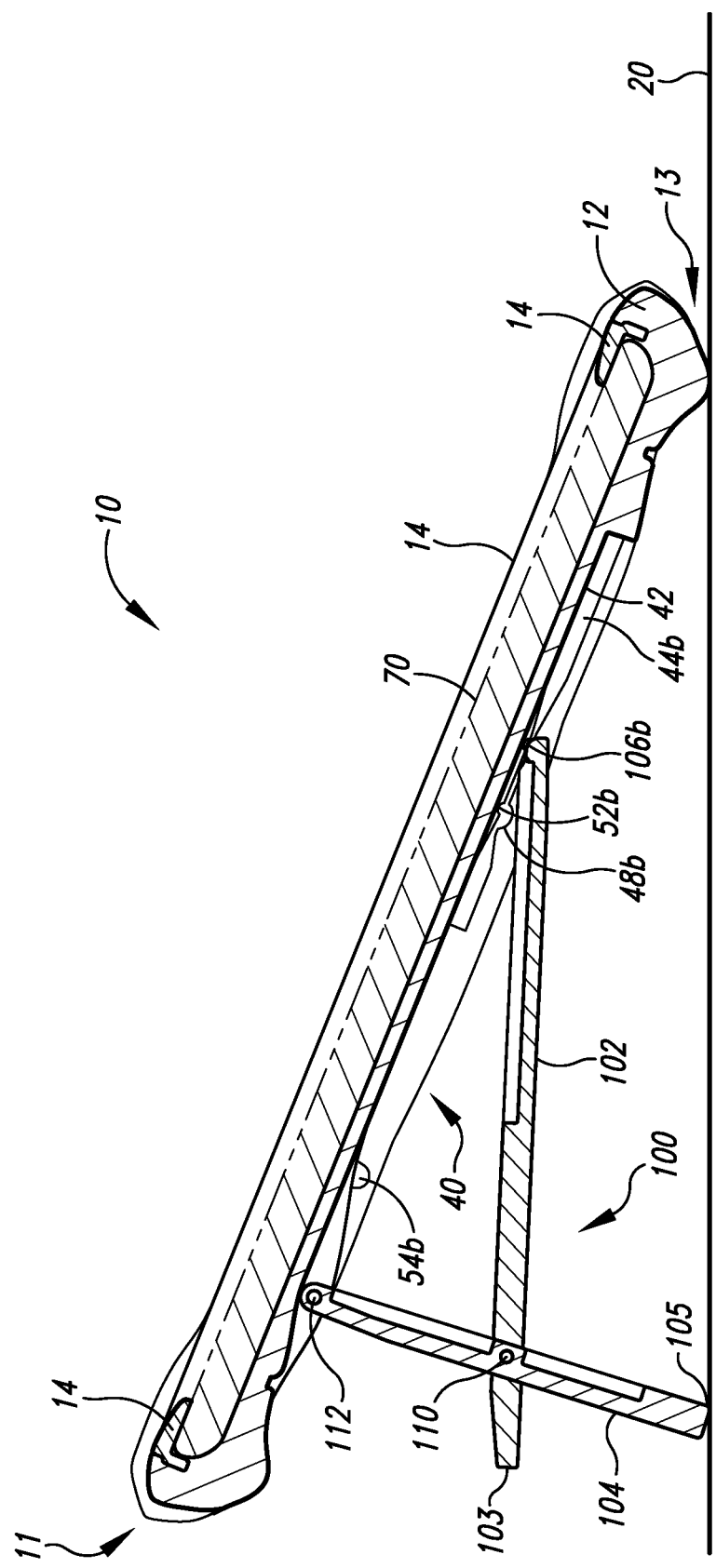
FIG. 10 is a cross sectional view of the portable device case showing its engagement portion with adjustable stand assembly engaged thereto in a second open disposition with a second orientation to a horizontal support surface.

Referring now to FIG. 10, portable device case 10 is shown in cross-sectional view wherein adjustable stand assembly 100 is engaged thereto in the second open disposition and a second orientation with horizontal edge 13 and end 105 of second member 104 both in contact with horizontal support surface 20.

Figure 11:
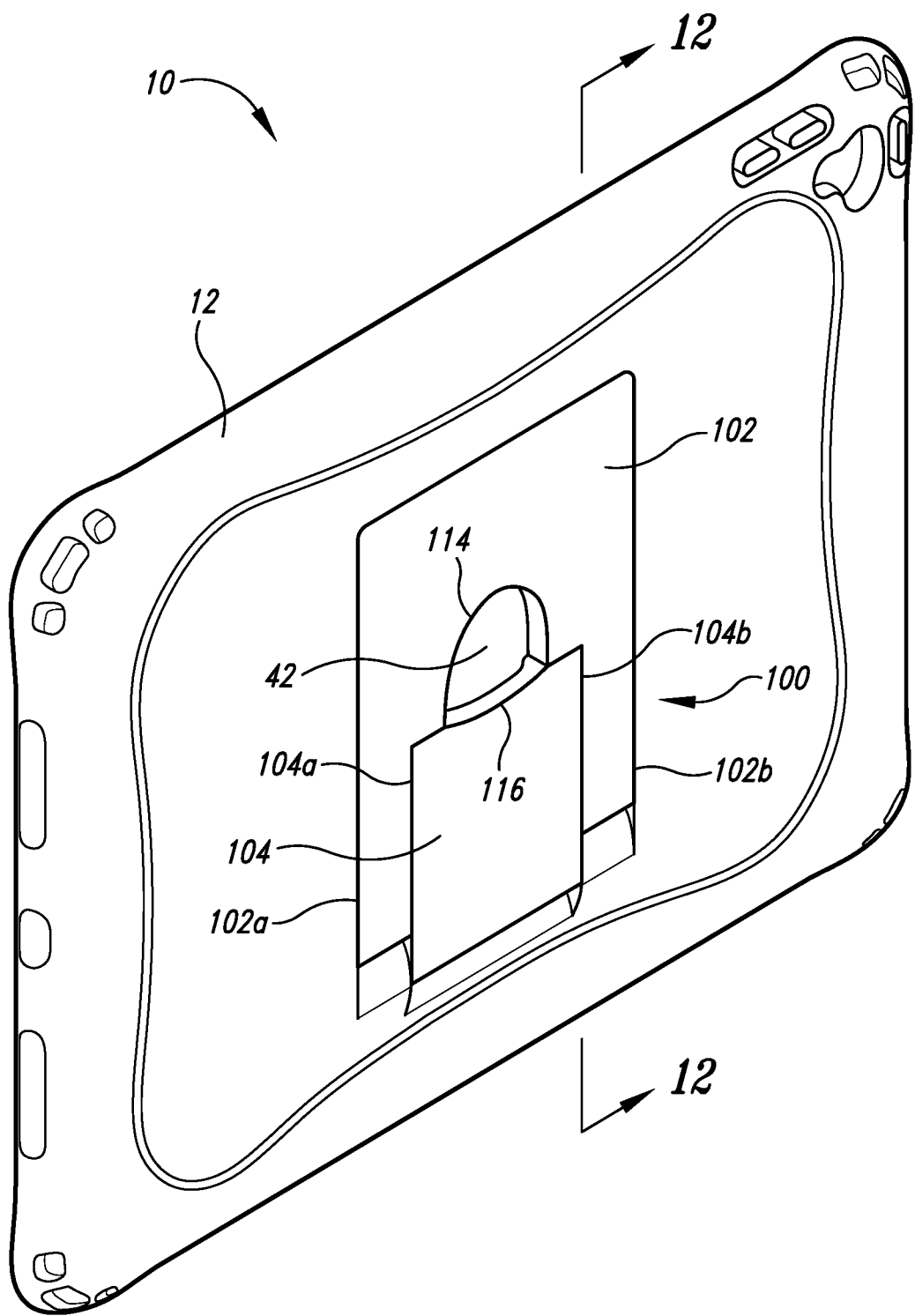
FIG. 11 is a rear perspective view of the portable device case showing its engagement portion with adjustable stand assembly engaged thereto in a closed disposition.

Referring now to FIG. 11, portable device case 10 is shown from a rear perspective view with adjustable stand assembly 100 engaged thereto in a closed disposition with the adjustable stand assembly 100 in a collapsed configuration to fit inside of recessed back 42. Tapered end 116 is shown positioned adjacent cutout access 114 to allow one or more fingers of a user to apply pulling force on tapered end 116 away from housing 12 to thereby open adjustable stand assembly 100 away from housing 12.

Figure 12:
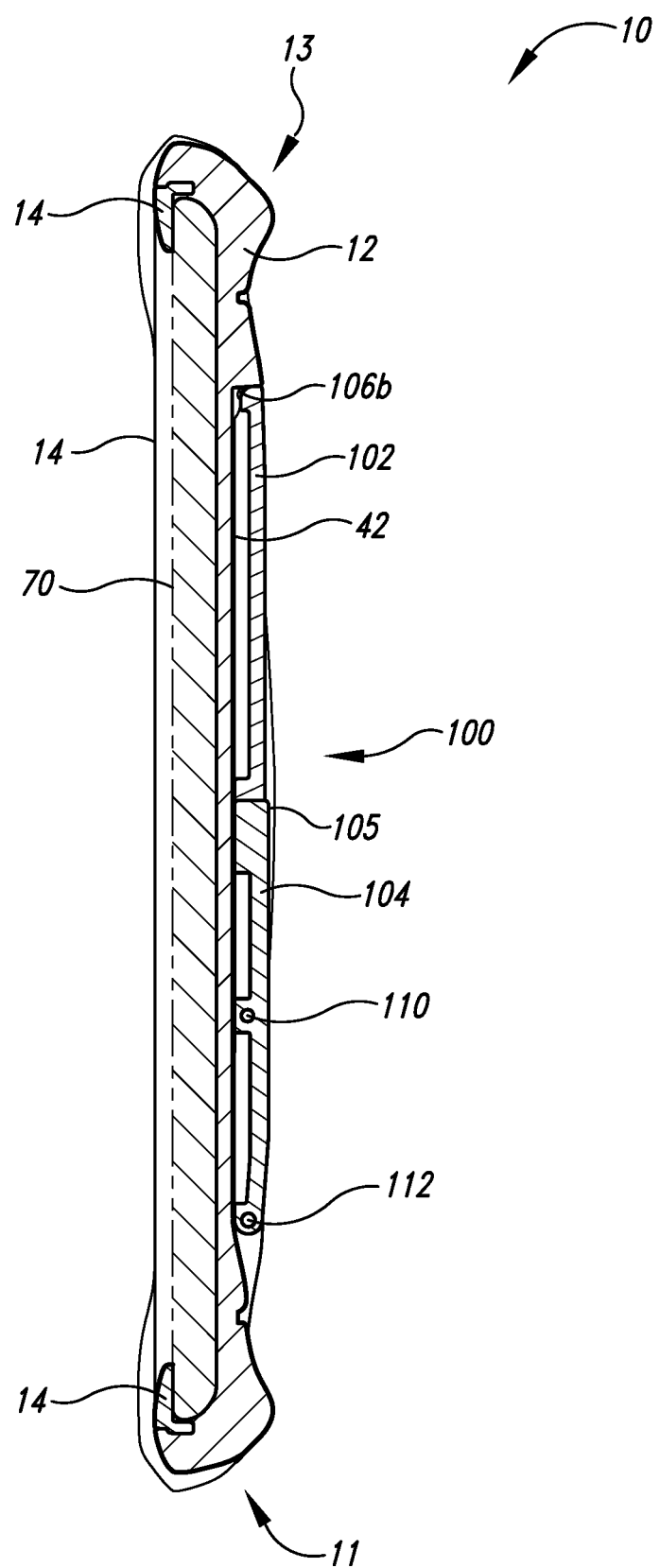
FIG. 12 is a cross sectional view of the portable device case of FIG. 11 showing its engagement portion with adjustable stand assembly engaged thereto in the closed disposition.

Referring now to FIG. 12, portable device case 10 of FIG. 11 is shown in cross sectional view of the portable device case of FIG. 11 in the closed disposition.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A portable electronic device case comprising:
a housing sized to receive a tablet shaped electronic device, the housing including a recessed back; and
a stand assembly movably coupled to the housing for adjustment of the stand assembly between one or more open dispositions and a closed disposition having a collapsed configuration, the recessed back sized to receive the stand assembly in the collapsed configuration,
the stand assembly rotatably coupled to the housing,
the stand assembly including a first member and a second member,
the first member being rotatably coupled to the second member, the first member including a first end rotatably coupled to the housing and a second end opposite the first end, the second member including a first end rotatably coupled to the housing and a second end opposite the first end,
the first member including a first portion and a second portion with a gap sized for the second member to extend therebetween, and
the housing including opposite sided first and second edges, in at least one of the open dispositions, in a first orientation, the entire second end of the first member being positioned to fully extend away from all portions of the first member that are adjacent to the second member, the entire second end of the second member being positioned to fully extend away from all portions of the second member that are adjacent to the first member, in the first orientation, the second end only of the first member, the second end only of the second member, and a first edge of the housing being positioned to concurrently contact a horizontal support surface.

2. The portable electronic device case of claim 1 wherein the recess back includes one or more catches and wherein the first member includes one or more pegs to detachably engage with the one or more catches.

3. The portable electronic device case of claim 2 wherein the one or more catches include one or more pairs of oppositely facing first and second catches that are positioned to simultaneously engage the one or more pegs.

4. The portable electronic device case of claim 3 wherein the first and second catches are oppositely facing and longitudinally spaced along one of the one or more pegs when detachably engaged therewith.

5. The portable electronic device case of claim 2 wherein the recessed back includes one or more tracks and wherein the first member includes one or more pegs to slidably engage with the one or more tracks.

6. The portable electronic device case of claim 5 wherein the second member is rotatably coupled to a shaft extending between the first portion and second portion of the first member.

7. The portable electronic device case of claim 6 wherein the second member includes a rod having first and second ends being rotatably coupled to the recess back.

8. The portable electronic device case of claim 1 wherein the first member has a cutout portion and wherein the second member has a tapered edge, the cutout portion being adjacent the tapered edge in the collapsed configuration of the stand assembly.

9. The portable electronic device case of claim 1 wherein the first member includes one or more nubs on opposite sides of the first member and wherein the recessed back includes one or more catches, the one or more nubs positioned to seat in one or more catches of the recessed back when the stand assembly is in the closed configuration.

10. The portable electronic device case of claim 1 wherein the housing further includes a bezel to frame a display of the tablet shaped electronic device.

11. A portable electronic device case comprising:
a housing sized to receive a tablet shaped electronic device, the housing including a recessed back; and
a stand assembly including a first member and a second member, the first member and the second member rotatably coupled together, the first member rotatably coupled to the recessed back for adjustment of the stand assembly between one or more open dispositions and a closed disposition having a collapsed configuration, the recessed back sized to receive the stand assembly in the collapsed configuration,
the first member including a first end rotatably coupled to the housing and a second end opposite the first end, the second member including a first end rotatably coupled to the housing and a second end opposite the first end, the first member including a first distance between the first end and the second end of the first member, the second member including a second distance between the first end and the second end of the second member, the first distance being greater than the second distance,
the first member including a first portion and a second portion with a gap sized for the second member to extend therebetween, and
the housing including opposite sided first and second edges, in one or more open dispositions, in a first orientation, the entire second end of the first member being positioned to fully extend away from all portions of the first member that are adjacent to the second member, the entire second end of the second member being positioned to fully extend away from all portions of the second member that are adjacent to the first member.

12. The portable electronic device case of claim 11 wherein the first member includes one or more pegs and wherein the recessed back includes one or more tracks and one or more catches, the one or more pegs configured to slidably engage with the one or more tracks and detachably engage with the one or more catches.

* * * * *